United States Patent [19]

Brix

[11] Patent Number: 5,182,237

[45] Date of Patent: Jan. 26, 1993

[54] BOROSILICATE GLASS FOR ELECTRONIC FLASH LAMPS

[75] Inventor: Peter Brix, Mainz, Fed. Rep. of Germany

[73] Assignee: Schott Glaswerke, Mainz, Fed. Rep. of Germany

[21] Appl. No.: 685,953

[22] Filed: Apr. 17, 1991

[30] Foreign Application Priority Data

Apr. 17, 1990 [DE] Fed. Rep. of Germany ....... 4012288

[51] Int. Cl.$^5$ .................... C03C 3/091; C03C 3/093
[52] U.S. Cl. ........................................ 501/66; 501/67
[58] Field of Search .................................. 501/66, 67

[56] References Cited

U.S. PATENT DOCUMENTS

| | | | |
|---|---|---|---|
| 3,208,860 | 9/1965 | Armistead et al. | 501/13 |
| 3,306,833 | 2/1967 | O'Leary | 501/13 |
| 4,001,019 | 1/1977 | Yamashita et al. | 501/13 |
| 4,396,720 | 8/1983 | Beall et al. | 501/66 |
| 4,550,087 | 10/1985 | Kerko et al. | 501/66 |
| 4,665,039 | 5/1987 | Kokubu et al. | 501/66 |
| 4,944,784 | 7/1990 | Kohli et al. | 501/13 |
| 5,017,521 | 5/1991 | Yale et al. | 501/66 |

*Primary Examiner*—Mark L. Bell
*Assistant Examiner*—C. M. Bonner
*Attorney, Agent, or Firm*—Millen, White, Zelano and Branigan

[57] ABSTRACT

A borosilicate glass is described of the composition on oxide basis in % by weight of 50–75 $SiO_2$, 11–18 $B_2O_3$, 1–5 $Al_2O_3$, 0–3 $Li_2O$, 0–3 $Na_2O$, 0–2 $K_2O$, 9–22 $Cs_2O$, 0–2 ZnO, 0–2 MgO, 0–3 CaO, 0–3 SrO, 0–3 BaO, provided that the sum of the alkali oxides, apart from $Cs_2O$, is at most 5 and the sum of the alkaline-earth oxides plus ZnO is at most 6. The glass is especially suitable for the production of electronic flash lamps, which with this glass reach a multiple of the service life of electronic flash lamps made from the conventional glass.

11 Claims, No Drawings

BOROSILICATE GLASS FOR ELECTRONIC FLASH LAMPS

BACKGROUND OF THE INVENTION

Electronic flash lamps are high-pressure discharge lamps, filled with xenon or krypton, for the pulse operation. They consist of a glass or silica glass tube, in whose ends the power lead-ins (anode, cathode) are sealed. The unheated cathode contains emitter materials to reduce the electron work function, in general cesium and barium oxide. The service life of a flash lamp is determined by the decrease of its light efficiency, which is caused by tinting the tube, probably by evaporated electrode material. The higher the flash output of an electronic flash lamp (with the same construction), the shorter the service life.

Since the use of the silica glass tube for the production of flash lamps is expensive, the majority of electronic flash lamps are produced from borosilicate glasses, since these glasses, in comparison with the silica glass, are more reasonably priced and exhibit a simpler glass processibility and a good matching of the seal to the metal of the glass bushing.

It is desirable within the art to obtain a borosilicate glass that makes possible the production of electronic flash lamps with a longer service life and/or higher flash output.

SUMMARY OF THE INVENTION

It is an object of the invention to provide a borosilicate glass that makes possible the production of electronic flash lamps with a long service life and/or flash output.

It is another object of the invention to provide electronic flash lamps with (1) longer service life, (2) higher output, and/or (3) smaller size.

These objects are achieved by utilizing a borosilicate glass for electronic flash lamps comprised of:

| | |
|---|---|
| $SiO_2$ | 50–75 wt. % |
| $B_2O_3$ | 11–18 wt. % |
| $Al_2O_3$ | 1–5 wt. % |
| $Cs_2O$ | 9–28 wt. % |
| $Li_2O_3$ | 0–3 wt. % |
| $Na_2O$ | 0–3 wt. % |
| $K_2O$ | 0–2 wt. % |
| $ZnO$ | 0–2 wt. % |
| $MgO$ | 0–2 wt. % |
| $CaO$ | 0–3 wt. % |
| $SiO$ | 0–3 wt. % |
| $BaO$ | 0–3 wt. % | where the total weight of alkali oxides, except for $Cs_2O$, has a maximum value of 5 wt. %, and the total weight of alkaline earth oxides plus ZnO falls within the range of 0–6 wt. %, and where wt. % is based on the weight of the total oxide starting with.

The glass contains 50 to 75% by weight of $SiO_2$ wherein the $SiO_2$ content is above 75% by weight it is increasingly difficult to process the glass, below 50% by weight of $SiO_2$, the thermal expansion increases so that a matching of the seal for the standard sealing metal increasingly worsens. A range of 60 to 65% by weight for the $SiO_2$ content is especially preferred.

The $B_2O_2$ content is maintained between 11 and 18% by weight, preferably between 14 and 18% by weight. The boric acid content is used to improve the devitrification stability of the glass as well as the chemical resistance. In exceeding the indicated range, the chemical resistance of the glass decreases again. If the $B_2O_3$ content drops below 11% by weight, the glasses are increasingly difficult to melt. $B_2O_3$ contents which are in the upper part of the indicated range are especially advantageous.

The $Al_2O_3$ content is maintained between 1 and 5% by weight, preferably between 1 and 3% by weight. The $Al_2O_3$ is used to stabilize the glass. In exceeding a content of 5% by weight, the glasses tend to separate and are increasing difficult to melt. The chemical resistance of the glass decreases where $Al_2O_3$ is below 1% by weight. In the preferred range, especially advantageous results are achieved with respect to the matching of the seal.

As alkali oxide, the glass is to contain mainly only $Cs_2O$, namely in amounts of 9–28% by weight. The higher the $Cs_2O$ content of the glass, the longer the service life of a flash lamp. But a content of 28% by weight is not to be exceeded, since then there is a danger that the matching of the seal to the usual sealing metals and alloys no longer exists. Improvements in the service life of the flash lamps are also still recognizable below 9% by weight of $Cs_2O$, but such a glass is too expensive relative to the improvement of the properties because of the high price of the cesium compounds.

Other alkali oxides may be present, if at all, only in small amounts up to 3% by weight each in the case of $Li_2O$ and $Na_2O$ and up to 2% by weight in the case of $K_2O$. The total content of alkali oxides, apart from $Cs_2O$, is not to exceed 5% by weight, since then the thermal expansion of the glasses is greater and thus the matching of the seal to the sealing metals become increasingly more difficult. The content of these alkali oxides preferably is as low as possible and does not exceed 1% by weight in each case, and it is most preferable that the total content of these alkali oxides is also below 1% by weight.

Alkaline-earth oxides and zinc oxide can be present in the glass in amounts of up to a total of 6% by weight. They are used to stabilize the glass. An alkaline-earth plus ZnO content of below a total of 1.5% by weight is preferred. The portion of the individual oxides of calcium, strontium and barium is not to be greater than 3% by weight each, the portion of MgO and ZnO is not to exceed 2% by weight each. In a preferred embodiment, BaO, SrO and ZnO are dispensed with, and only MgO and CaO are used in an amount of 0.9 or 1% by weight at most.

The glasses of this invention can further contain conventional fining agents in conventional portions. Conventional fining agents are, e.g., $As_2O_3$, $Sb_2O_3$, which normally remain in amounts up to 1% by weight, preferably up to 0.6% by weight, in the finished glass or $CeO_2$, which is used in amounts of up to 1.5% by weight, preferably 1% by weight in the finished glass. In the case of alkali compounds, whose fining action is based mainly on their decomposition or volatilization, a residue remains in the glass as part of the alkali oxide content. While oxide finishing agents are included in calculating the wt. % of total oxide in the glass, the residues, such as $Na_2O$ generated from NaCl, are not included in the total oxide value because the amount of residue depends on the refining conditions.

The load capacity of electronic flash lamps made of the glass of this invention is increased in comparison with usual lamps by a factor of about 2 to 20 and more, and a close connection exists between the increase of the load capacity and the $Cs_2O$ content. The glass of the present invention makes possible the production of (1) lamps with higher service life in the case where the same output as conventional lamps is desired, (2) lamps with a higher output in the case where the same service life as conventional lamps is desired, and (3) lamps of a substantial reduction size in the case where the same output and service life as conventional lamps is desired.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents, and publications, cited above and below, and of corresponding German Application P 40 12 288.3-45, filed Apr. 17, 1990, are hereby incorporated by reference.

EXAMPLES

A number of glasses were melted from glass raw materials in conventional, inductively heated platinum crucibles. The composition in % by weight, thermal expansion coefficient (alpha) according to DIN 52 328, as well as glass transformation temperature (Tg) according to DIN 52 324 of the glasses as well as, for comparison, that of a conventional glass used for flash lamps are indicated in the table which follows.

In the case of glasses Nos. 1 to 4, the matching of the seal was measured relative to the comparison glass, in the case of glass No. 5, relative to a borosilicate glass (Duran ® 8330, SCHOTT Glaswerke) and, in the case of glass No. 6, relative to a sealing glass (SCHOTT Glaswerke, Glass type 8250), which is especially suitable for the sealing of iron-cobalt-nickel alloys (Kovar ®) according to DIN 52327. The stress in the comparison standard is indicated in nm cm$^{-1}$. Negative values mean tensile stress, positive values mean compressive stress.

Tubes with an outside diameter of 3.15 mm and an inside diameter of 1.9 mm were drawn from the glasses. Flash lamps of a length of 25 mm and combustion length (= electrode distance) of 15 mm were produced from these tubes with tungsten lead-ins. The flash lamps had a cathode activated with $Cs_2O/BaO$ and were filled with xenon under a pressure of 1000 mbars.

In the case of a normal setting of the flash energy of 15 Ws per flash, the flash lamp of the comparison glass showed a reduction of light of 10% after about 2000 flashes, by measuring the intensity of the flash with a short time light meter, while such a flash lamp from glass No. 2 was still completely usable after 7500 flashes.

In the case of the setting of a flash output of 30 Ws, lamps from the comparison glass showed, after 2000 flashes, a failure (inoperable due to cracks or blackening of the inside of the tube) of about 95%, flash lamps from glass No. 1 showed a failure of about 50% and lamps from glass No. 2 showed a failure of about 5%. Thus, the superiority of the new glasses becomes especially clear.

TABLE

|  | Comparison | 1 | 2 | 3 | 4 | 5 | 6 |
| --- | --- | --- | --- | --- | --- | --- | --- |
| $SiO_2$ | 75.40 | 69.45 | 63.20 | 60.90 | 61.40 | 71.20 | 55.80 |
| $B_2O$ | 17.00 | 15.25 | 15.60 | 16.50 | 16.50 | 11.70 | 14.45 |
| $Al_2O_3$ | 1.20 | 1.25 | 1.05 | 2.25 | 1.75 | 2.10 | 2.15 |
| $Na_2O$ | 3.80 | 2.10 | — | — | — | — | — |
| $K_2O$ | 1.40 | 0.70 | 0.50 | 0.70 | — | — | — |
| $Cs_2O$ | — | 9.90 | 18.40 | 18.40 | 19.10 | 15.00 | 27.00 |
| MgO | 0.40 | 0.40 | 0.35 | 0.35 | 0.35 | — | — |
| CaO | 0.60 | 0.55 | 0.50 | 0.50 | 0.50 | — | — |
| BaO | — | — | — | — | — | — | — |
| ZnO | — | — | — | — | — | — | 0.50 |
| NaCl | 0.45* | 0.40* | 0.40* | 0.40* | 0.40* | 1.65* | — |
| $As_2O_3$ | — | — | — | — | — | — | 0.10 |
| alpha (ppm/K) | 3.90 | 3.85 | 3.76 | 4.22 | 3.94 | 3.36 | 4.50 |
| Tg (°C.) | 516 | 525 | 521 | 524 | 529 | 542 | 530 |
| Sealing sp. | ±0 | −115 | −220 | +80 | −40 | +8 | −351 |

*Fining agent resulting in an increase of the $Na_2O$ content to about 0.1% by weight.
**NaCl was used to determine the wt. % values reported in the table. Any deviation from 100% is due to rounding errors.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A uniformly clear finished borosilicate glass in the form of a hollow tube for electronic flash lamps consisting essentially of

| | |
| --- | --- |
| $SiO_2$ | 50–75 wt. % |
| $B_2O_3$ | 11–18 wt. % |
| $Al_2O_3$ | 1–5 wt. % |
| $Cs_2O$ | 9–28 wt. % |
| $Li_2O_3$ | 0–3 wt. % |
| $Na_2O$ | 0–3 wt. % |
| $K_2O$ | 0–2 wt. % |
| ZnO | 0–2 wt. % |
| MgO | 0–2 wt. % |
| CaO | 0–3 wt. % |
| SiO | 0–3 wt. % |
| BaO | 0–3 wt. % | wherein the total weight of alkali oxides, except for $Cs_2O$, has a maximum value of 5 wt. %, and the total weight of alkaline earth oxides plus ZnO falls within the range of 0-6 wt. %, and where wt. % is based on the weight of the total oxide, and optionally 1.5 wt. % based on the weight of the total oxides of a fining agent selected from the group consisting of $Sb_2O_3$, $CrO_2$, NaCl and $As_2O_3$.

2. A borosilicate glass according to claim 1, consisting essentially of:

| | |
|---|---|
| $SiO_2$ | 60-65 wt. % |
| $B_2O_3$ | 14-18 wt. % |
| $Al_2O_3$ | 1-3 wt. % |
| $Li_2O$ | 0-1 wt. % |
| $Na_2O$ | 0-1 wt. % |
| $K_2O$ | 0-1 wt. % |
| $Cs_2O$ | 16-22 wt. % |
| ZnO | 0-2 wt. % |
| MgO | 0-0.9 wt. % |
| CaO | 0-1 wt. %. |

3. A borosilicate glass as in claim 1, wherein the total weight of alkali oxides, except for $Cs_2O$, has a maximum value of 1.0 wt. %, and the total weight for alkaline earth oxides plus ZnO is below 1.5 wt. %.

4. A borosilicate glass as in claim 2, wherein the $Cs_2O$ is present in a concentration of 18-19 wt. %.

5. A borosilicate glass according to claim 1 free of $Sb_2O_3$.

6. A borosilicate glass according to claim 2 free of $Sb_2O_3$.

7. A borosilicate glass according to claim 3 free of $Sb_2O_3$.

8. A borosilicate glass according to claim 4 free of $Sb_2O_3$.

9. A borosilicate glass according to claim 5 having not more than 0.1% $As_2O_3$.

10. A borosilicate glass for electronic flash lamps consisting essentially of

| | |
|---|---|
| $SiO_2$ | 50-75 wt. % |
| $B_2O_3$ | 11-18 wt. % |
| $Al_2O_3$ | 1-5 wt. % |
| $Cs_2O$ | 9-28 wt. % |
| $Li_2O_3$ | 0-3 wt. % |
| $Na_2O$ | 0-3 wt. % |
| $K_2O$ | 0-2 wt. % |
| ZnO | 0-2 wt. % |
| MgO | 0-2 wt. % |
| CaO | 0-3 wt. % |
| SiO | 0-3 wt. % |
| BaO | 0-3 wt. % | wherein the total weight of alkali oxides, except for $Cs_2O$, has a maximum value of 5 wt. %, and the total weight of alkaline earth oxides plus ZnO falls within the range of 0-6 wt. %, and where wt. % is based on the weight of the total oxide, and optionally 1.5 wt. % based on the weight of the total oxides of a fining agent selected from the group consisting of $CrO_2$, NaCl, and $As_2O_3$.

11. A borosilicate glass according to claim 10 having not more than 0.1% $As_2O_3$.

* * * * *

UNITED STATES PATENT AND TRADEMARK OFFICE
CERTIFICATE OF CORRECTION

PATENT NO. : 5,182,237
DATED : January 26, 1993
INVENTOR(S) : Peter BRIX It is certified that error appears in the above-identified patent and that said Letters Patent is hereby corrected as shown below:

Claim 1, Col. 5, line 5: Delete $(CrO_2)$ and insert -- $CeO_2$ --

Claim 10, Col. 6, line 28: Delete $(CrO_2)$ and insert -- $CeO_2$ --

Signed and Sealed this

Eighth Day of February, 1994

*Attest:*

BRUCE LEHMAN

*Attesting Officer*  *Commissioner of Patents and Trademarks*